(12) United States Patent
Fleming et al.

(10) Patent No.: US 6,358,854 B1
(45) Date of Patent: *Mar. 19, 2002

(54) METHOD TO FABRICATE LAYERED MATERIAL COMPOSITIONS

(75) Inventors: James G. Fleming; Shawn-Yu Lin, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,702

(22) Filed: Apr. 21, 1999

(51) Int. Cl.$^7$ ................................................. H01L 33/00
(52) U.S. Cl. ...................................................... 438/692
(58) Field of Search ................................ 438/690, 691, 438/692, 800, 959, 962; 257/17, 14

(56) References Cited

U.S. PATENT DOCUMENTS

| | | | | |
|---|---|---|---|---|
| 5,335,240 A | * | 8/1994 | Ho et al. ........................ | 372/39 |
| 5,365,541 A | * | 11/1994 | Bullock ........................ | 372/99 |
| 5,386,215 A | * | 1/1995 | Brown ........................ | 343/795 |
| 5,406,573 A | * | 4/1995 | Ozbay et al. ................ | 372/43 |
| 5,440,421 A | * | 8/1995 | Fan et al. .................... | 359/344 |
| 5,541,613 A | * | 7/1996 | Lam et al. ................ | 343/792.5 |
| 5,541,614 A | * | 7/1996 | Lam et al. ................ | 343/792.5 |
| 5,559,282 A | * | 9/1996 | Scalora et al. ................ | 372/96 |
| 5,600,342 A | * | 2/1997 | Dikuski et al. ............. | 343/909 |
| 5,600,483 A | * | 2/1997 | Fan et al. .................... | 359/344 |
| 5,651,818 A | * | 7/1997 | Milstein et al. ................ | 17/56 |
| 5,734,174 A | * | 3/1998 | Horiguchi et al. ............. | 257/17 |
| 5,784,400 A | * | 7/1998 | Joannopoulos et al. ....... | 372/96 |
| 5,997,795 A | * | 12/1999 | Danforth et al. ............. | 204/401 |
| 5,998,298 A | * | 12/1999 | Flemming .................... | 432/692 |
| 5,999,308 A | * | 12/1999 | Nelson et al. .............. | 359/321 |
| 6,130,780 A | * | 10/2000 | Joannopoulos et al. ...... | 359/584 |

\* cited by examiner

Primary Examiner—Savitri Mulpuri
(74) Attorney, Agent, or Firm—Brian W. Dodson

(57) ABSTRACT

A new class of processes suited to the fabrication of layered material compositions is disclosed. Layered material compositions are typically three-dimensional structures which can be decomposed into a stack of structured layers. The best known examples are the photonic lattices. The present invention combines the characteristic features of photolithography and chemical-mechanical polishing to permit the direct and facile fabrication of, e.g., photonic lattices having photonic bandgaps in the $0.1-20\mu$ spectral range.

43 Claims, 9 Drawing Sheets

Structure Layer 1

Structure Layer 2

Structure Layer 3

Structure Layer 4

METHOD TO FABRICATE LAYERED MATERIAL COMPOSITIONS

GOVERNMENT RIGHTS

This invention was made with Government support under Contract DE-AC04-94AL85000 awarded by the U.S. Department of Energy. The Government has certain rights in the invention.

FIELD OF THE INVENTION

The present invention relates generally to layered material compositions and related structures, in particular to photonic lattices, and more particularly to a method for fabricating photonic lattices having photonic bandgaps in the optical spectrum.

BACKGROUND OF THE INVENTION

Layered material compositions are materials which exhibit spatial variation of physical properties, composition, or other tangible characteristics, where that spatial variation produces useful bulk properties of the layered material compositions, and the spatial variation can be subdivided a stack of structured layers (the stack can consist of a single layer), which are assembled atop one another with appropriate alignment between the various structured layers. An individual structured layer can exhibit one-, two-, or three-dimensional variation of physical properties, so long as the surfaces of the layers are substantially flat.

Such layered material compositions exhibit a wide range of fascinating, unique, and useful "bulk" physical properties which result from the collective interaction of the spatially varying properties of their constituent materials. One of the most interesting classes of layered material compositions is the photonic lattice, which is a layered material composition which has a spatially varying index of refraction. Photonic lattices will be used as an example throughout this disclosure, and are described in some detail below. It is sufficient at this point to describe two primary optical phenomena which can be exhibited by photonic lattices. A photonic bandgap can appear, being a region of photon energy in which photons cannot propagate. Also, many types of photonic lattices will exhibit rapidly varying "bulk" indices of refraction in certain wavelength regimes. Both of these phenomena are the basis for many useful optical devices.

Many other classes of interesting and useful layered material compositions exist. For example, if a layered material composition has an appropriate spatial variation in, e.g., sound velocity or mass density, it will exhibits a phononic bandgap, i.e., a solid which does not allow propagating sound waves with phonon energies inside the phononic bandgap. It is also possible to produce structures exhibiting unusual and useful electronic properties, such as are associated with superlattices and other layered structures, but where the spatial variation in electronic properties is two-or three dimensional in character. It is also possible to build up two- and three-dimensional active and passive circuitry using the present invention. A further example involves the ability to control mechanical properties, including strength, by introducing a spatial variation in material characteristics on a small size scale. All such compositions, where certain bulk material properties depend intrinsically on the presence of the spatially varying physical properties within and between structured layers, are layered material compositions.

Throughout this disclosure Applicants will focus on the application of the present invention to the fabrication of a particular class of layered material compositions, namely photonic lattices. The term "photonic lattice" is used to describe any structure or material having bulk optical properties associated with a layered spatial variation of refractive index. This includes periodic, quasiperiodic, and aperiodic structures.

The best known property exhibited by some photonic lattices is a photonic bandgap. A material shows a photonic bandgap if there exists a region in energy-momentum space wherein propagating photon modes do not exist. Various structures can exhibit a partial photonic bandgap (a bandgap along some directions), a complete photonic bandgap (a bandgap along all directions, but which do not necessarily overlap in energy), a photonic stopgap (a range of photon energy in which photon propagation is not allowed along any direction), or no photonic bandgap at all. Photonic lattices which do not exhibit a bandgap can still have anisotropic and strongly varying bulk dispersion associated with the spatially varying refractive index. Such bulk optical effects can appear in strictly dielectric layered material compositions, in compositions comprising discrete regions of dielectric and metallic materials, and in various intermediate cases. Any structure exhibiting spatial variation of the local optical properties herein called a photonic lattice. If said structure can be split into a stack of structured layers, it is then also a layered material composition.

Photonic lattices are under investigation for applications in which their unusual interactions with electromagnetic radiation are useful. In their simplest form, such photonic lattices are based on a one-, two-, or three-dimensional periodic refractive index. (Recall that such periodicity is not required.) In such structures the propagation of electromagnetic waves is governed by multiple interference effects leading to wavelength-energy dispersion relationships similar to those describing the motion of electrons in solids. Traditional electron-wave concepts such as reciprocal space, Brillouin zones, dispersion relations, Bloch wave functions, and semiconductor bandgap have electromagnetic counterparts in photonic lattices. Defect states (which allow propagation of very narrow bandwidths in particular directions) can be introduced into the photonic bandgap by adding or subtracting a small amount of material from the ideal structure.

Perhaps the most significant property which can be exhibited by a photonic lattice is the photonic bandgap, a range of photon energies for which no propagating photon modes exist. This effect is analogous to the semiconductor bandgap in solids, which defines a range of energies in which propagating electrons cannot exist. Not all photonic lattices exhibit such a bandgap. Prediction of the properties of a photonic lattice can be carried out using techniques known in the art which are again analogous to those used to calculate electronic band structures in solids. Qualitatively, however, a wide photonic bandgap is encouraged by a number of factors, including:

1. Large ratio between largest and smallest refractive index in the photonic lattice.
2. The existence of continuous sublattices of low and high refractive index throughout the photonic lattice.
3. The volume fraction of the high refractive index sublattice should be less than that of the low refractive index sublattice.

The above list has been simplified by using language which implies the photonic. lattice comprises discrete regions having distinct refractive indices. Such discreteness is not required, and any effect which will be discussed in this specification can be found in a photonic lattice having continuously varying refractive index. Also note that whereas the structures which are easiest to analyze are also infinite in physical extent, real photonic lattices have limited spatial dimensions, and as such are technically distinct from theoretical photonic lattices of infinite extent. We shall consider structures with limited physical extent which can be embedded in a photonic lattice of infinite extent also to be a photonic lattice.

The physics which governs photonic lattices and the formation of photonic bandgaps scales with changes in wavelength in a manner which allows (at least in principle) photonic lattices which exhibit bandgaps to exist on any size scale. Indeed, the first demonstration materials were designed for microwave frequencies, and were assembled from bulk epoxy and Styrofoam pieces. Later, silicon micromachining was used to fabricate photonic lattices active in the millimeter wavelength range. Until the present invention was developed, however, only crude demonstrations of two- and three-dimensional photonic lattices had been made which produced a bandgap in what we are calling the optical regime, which comprises optical wavelengths from roughly $20\mu$ down to perhaps $0.1\mu$. (The long wavelength end represents the ultimate capability of conventional micromachining approaches toward fabrication, and the short wavelength end is defined by the lack of materials having sufficiently large electronic energy gaps for transparency.)

In this optical regime, fabrication of photonic lattices prior to the instant invention has been limited to three general types. First, the conventional "dielectric mirror", which is a stack of uniform thin films with differing refractive indices. Second, the formation of one- and two-dimensional photonic lattices through definition of features (usually cylinders or cylindrical holes) in a semiconductor substrate using photolithography for long optical wavelengths (e-beam or x-ray lithography has been used for shorter wavelengths), followed by etching to remove the high refractive index material in unwanted regions. In the final type of procedure, a very thin layer (1–3 periods) of three-dimensional photonic lattice has been formed in semiconductors by placing an etch masking layer on the surface, lithographically defining a 2-d periodic array of small holes in that layer, then applying an anisotropic etch along several (usually three) lattice axes to produce a three-dimensional structure commonly called Yablonovite. Properly designed, this structure exhibits a narrow stop gap.

The procedures described above allowed fabrication of photonic lattices having sufficient quality to confirm the basic theoretical ideas underlying their design and operation, but had a number of practical limitations. Overlying the problem of fabricating large-scale high performance photonic lattices is the requirement that the variation in refractive index accurately follow the model structure — variations (especially cumulative variations) relative to the model structure can lead to poor and variable response. Consider the anisotropic etch fabrication of Yablonovite outlined above. Production of high-quality Yablonovite depends on being able to anisotropically etch away holes of constant cross-sectional shape and size precisely along the desired axes.

In practice, however, attempts to make this structure have yielded structures with mediocre performance. It is clear that the cross-sectional area of the etched holes cannot be constant unless the etch is infinitely anisotropic, which is not the case. The nature of the etched holes will change substantially as soon as holes etched along different directions overlap. In fact, any misalignment, taper, or scatter of the holes leads to a progressive deterioration in the quality of the photonic lattice. A point is quickly reached where additional layers cannot participate in the collective definition of the desired optical properties, and only serve to scatter the light. Such problems are encountered even in microwave structures fabricated by conventional machining of epoxies.

When a photonic lattice is also a layered material composition, it is natural to try to simplify the fabrication process by growing individual structured layers, rather than trying to fabricate the entire structure at once. However, in practice the individual structured layers are severely impacted by variations in topography (e.g., lack of planarity) which appears as the result of nearly any growth technique or combination of techniques. These variations in topography disrupt the basic structure defined for each structured layer, and also alter the optimum alignment between structured layers from that predicted for a stack of the correct structured layers. These influences result in serious and cumulative structural errors when trying to fabricate photonic lattices using conventional multi-layer microelectronic fabrication techniques. These effects are essentially unavoidable when using conventional microelectronic fabrication techniques. An improved fabrication technique is sorely needed.

One can outline the requirements for a fabrication technique capable of making high performance photonic lattices (or other layered material compositions) of arbitrary dimensions. The difficulties involved with forming holes with large aspect ratios precisely directed along crystal axes are fundamental, and save for certain special purposes, such techniques are to be avoided. This suggests that a layer-by-layer process, in which the desired structure is grown and defined one structured layer at a time, should be developed. For such a fabrication process to be successful in making high-performance photonic lattices, however, it must allow precise definition and formation of features within each layer, it must allow precise control of layer thickness, it must insure layer planarity, and must allow the features within each layer to be precisely aligned relative to those on other layers in the desired structure. It is a given that any real fabrication technique will introduce errors. An additional requirement is then that such errors be small, and that their effect should preferably be random rather than cumulative in nature.

In the present invention, the thickness and planarity of each structured layer is controlled by a post-fabrication chemical-mechanical polishing step. In addition, the relative positions of subsequent structured layers are controlled by aligning the mask works either to a previous layer or to alignment marks on the substrate. (Global reference marks can be replicated as later structured layers are added so that alignment and position of structured layers can be traced to the came set of original reference marks.) As the remaining non-random structural errors do not accumulate fast enough to interfere with the proper function of the ultimate product, the present invention can be used to form layered material compositions of any dimensionality.

An advantage of the present invention is that layer-by-layer fabrication of layered material compositions with precise thickness, planarity, and alignment control is enabled thereby.

Another advantage of the present invention is that photonic lattices can be formed thereby having photon bandgaps within the range of several tens of microns down to perhaps 0.1 microns, thereby covering the regions of the optical spectrum commonly called the far-IR, the near-IR, the visible, and the ultraviolet.

An additional advantage of the present invention is that it allows fabrication of layered material compositions requiring structural features smaller than can be directly defined by the lithographic stepper mechanism.

A further advantage of the present invention is that it can be adapted to the fabrication of layered material compositions comprising a wide range of materials. Most metals, semiconductors, and insulators can be included in a layered material composition using the present invention.

Yet another advantage is that the present invention can be used to create a layered material composition over a large area. The ultimate area is that of the substrate used in the fabrication process—Applicants have demonstrated substantially uniform growth and optical properties in a photonic lattice grown over a 6 inch Si wafer.

These and other advantages of the present invention will become evident to one skilled in the art.

SUMMARY OF THE INVENTION

The present invention relates to a method for fabricating layered material compositions, said method comprising forming one or more structured layers exhibiting spatially varying physical properties; planarizing each structured layer by chemical-mechanical polishing after formation of that layer; and insuring proper relative alignment and positioning amongst the various structured layers.

Many structured layers can be formed by steps comprising depositing a layer of a first material, patterning the layer of first material to form an array of shaped openings therein, and depositing a second material to partially or completely cover the first material and to overfill all or a majority of the shaped openings. A fillet procedure and/or specialized etching techniques can often be adapted to fabricate structural features having feature size smaller than the resolution of the lithographic steppers.

The combined deposition can then be planarized with respect to the substrate surface by chemical-mechanical polishing to remove the combined deposit typically down to the level of the underlying first material. One of the first and second materials is used to form the spaced elements, and the other of the materials forms a spacer material separating or surrounding the elements. The spacer material can optionally be removed by a subsequent selective etching process step (e.g., removing an $SiO_2$ spacer material using an HF/water etchant).

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims and drawings.

DETAILED DESCRIPTION

Again, although the fabrication of photonic lattices will be emphasized in the description below, this is being done for convenience. A photonic lattice is simply a specific example of a layered material composition. There is no intent to limit the scope of the present invention thereby, said limit to be defined by the appended claims in light of the disclosure and figures.

Figure 1:
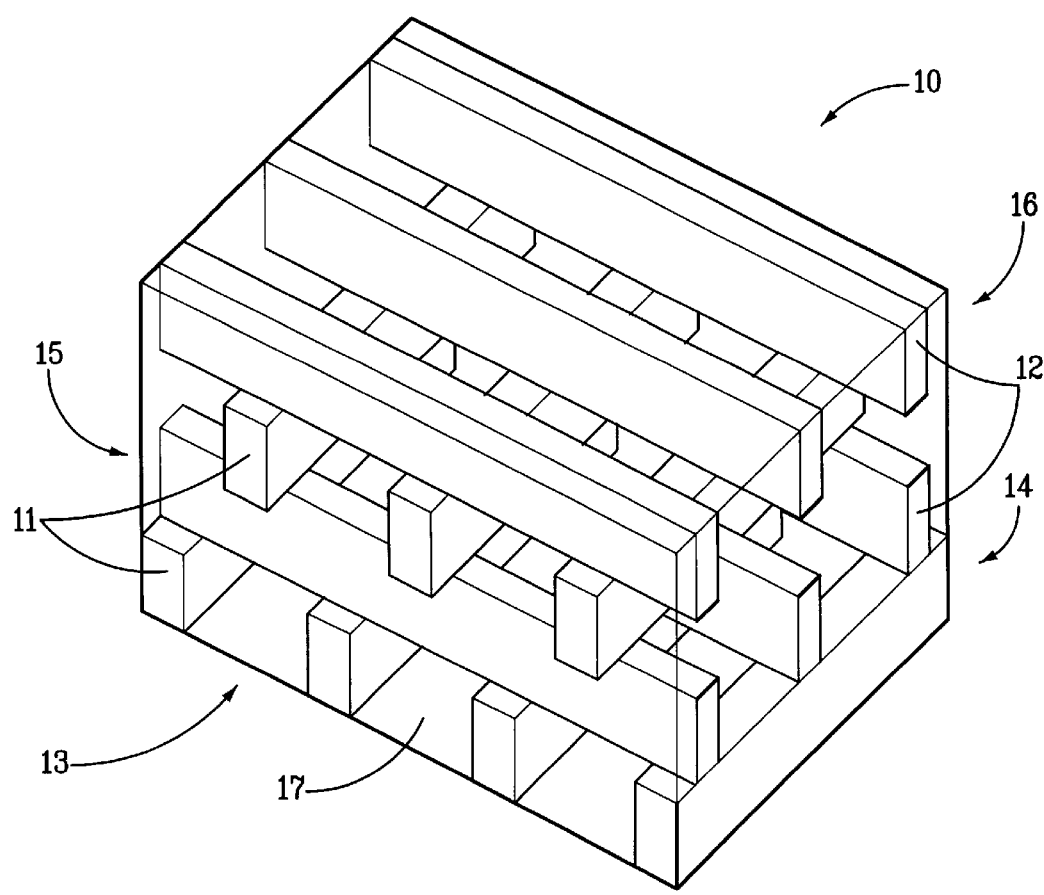
FIG. 1 shows a schematic view of a three-dimensional Lincoln-Log layered material composition.

A particularly simple example of a photonic lattice is that shown in FIG. 1. This type of structure is often called a Lincoln-Log structure—the reason being that such a structure 10 looks like a carefully stacked pile of logs 11 and 12. More properly, the structure 10 decomposes into a stack of structured layers 13, 14, 15, and 16. The "logs" 11 and 12 consist essentially of a first optical material, have a roughly rectangular cross-section, and are substantially parallel within a given structured layer. As shown here, the logs can have different shapes and sizes depending on where in the structure they appear. The material 17 between and surrounding the logs consists essentially of a second optical material, again typically in intimate optical contact with the first optical material.

Applicants have used the method of the present invention to make Lincoln-Log photonic lattices from silicon-based materials which exhibit bandgaps in the first case from roughly 10–14.5$\mu$ and in the second case from 1.35–1.95$\mu$. Here the "logs" were essentially made of polysilicon, and the second material is air. These were the first layer-by-layer photonic lattices to exhibit three-dimensional photonic stopgaps in the optical spectrum.

The basic layer-by-layer method for fabricating the above example according to the present invention is illustrated in FIGS. 2a–2e, which show a series of schematic views of various stages in the process. The exact materials and detailed process steps described here do not limit the present invention, but reflect a specific embodiment of this new fabrication method. In this initial demonstration Applicants produced a photonic lattice with a photonic stopgap in the 10–15$\mu$ region. Some conventional photolithographic steps which are applied for a purpose well known in the art are described but not illustrated specifically.

Figure 2A:
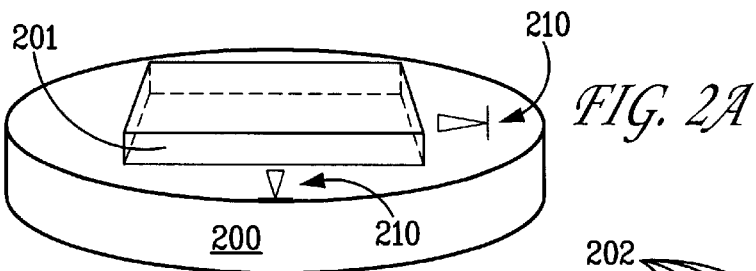
FIG. 2 shows various stages in the fabrication of a photonic lattice according to the present invention.

In FIG. 2a, a layer 201 composed essentially of a first material, e.g., silica, is deposited onto a silicon substrate 200. The thickness of layer 201 is greater than the desired thickness of the first structured layer of the photonic lattice, whose thickness is typically in the range 0.02$\mu$–10$\mu$. In Applicants first example, the structured layer thickness is 1.6$\mu$, and the initial thickness of layer 201 is approximately 2.0$\mu$.

Figure 2B:
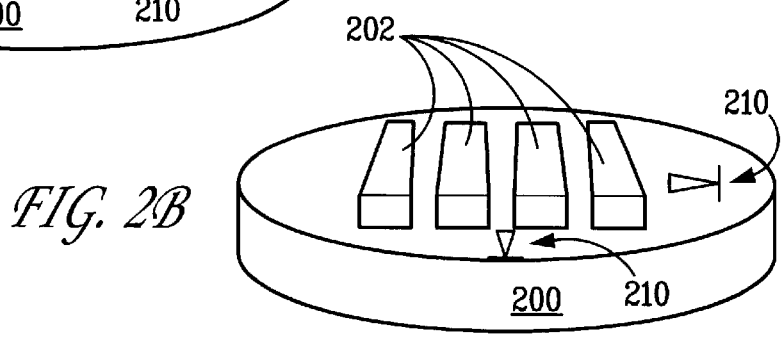

FIG. 2b shows the fabrication of a photonic lattice at a point where layer 201 has been patterned to form a plurality of evenly spaced and parallel spacer bars 202 with approximately rectangular cross-section. Such patterning can be accomplished using a photolithographic etch mask (not shown) over layer 201 with a plurality of openings in the etch mask at the locations where the material in layer 201 between the spacer bars 202 is to be removed. An anisotropic etching process is then used (e.g., reactive ion etching directed normal to the surface), resulting in bars having approximately rectangular cross-section. The etching step is preferably performed to etch completely down through layer 201. After the etch mask is stripped, the structure of FIG. 2b is found. In Applicants first example, the pitch between adjacent spacer bars was $4.2\mu$, and the width of the spacer bars was $3.0\mu$.

Figure 2C:
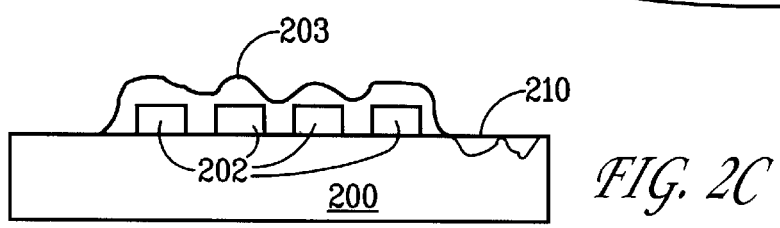

In FIG. 2c, a second material 203 (in this case polysilicon) is deposited to fill in the regions between spacer bars 202. The layer thickness is greater than $1.6\mu$, the desired thickness of the final structured layer. Depositing the second material generally leads to a complex and non-planar surface. This is due to a combination of two effects. First, polysilicon depositions tend to have large surface roughness. Second, when a surface with deeply etched features is covered over by another deposited material, the resulting surface has complex topography, with low spots where the etched features have been covered.

It is essentially impossible to grow high-quality multi-layered material compositions using a layer-by-layer process when the growth surface has this level of roughness and unevenness. Even in a single layer structure intended for electronic or photonic applications, the scattering and uncontrolled reflections of the carriers from the growth surface will result in poor and somewhat unpredictable performance relative to the design criteria. To solve this problem, and allow general layered material compositions to be grown, Applicants have developed a process to planarize the surface or the structure, and also to reduce its thickness to the proper design value. Chemical-mechanical polishing (CMP) of the growth surface is carried out between deposition of subsequent layers, thereby eliminating the problem. Some of this material was previously disclosed in U.S. patent application Ser. No. 09/067,614, by inventors including the present inventors, filed on Apr. 28, 1998, which is hereby included by reference.

Chemical-mechanical polishing is carried out with a CMP apparatus (not shown) which includes a moveable or rotatable polishing platen upon which a polishing pad is mounted. A wafer carrier is used to hold substrate 200 with the deposited layers typically facing downward. The deposited layers are then brought into contact with the polishing pad using applied pressure. The deposited layers are slowly polished away by contact with the polishing pad, which has an abrasive and chemically-reactive slurry thereon. Chemical-mechanical polishing can be used for planarization of nearly any material which might be used to form a photonic lattice. Variation of process parameters to control the polishing rate and surface finish are well-known in the art.

Figure 2D:
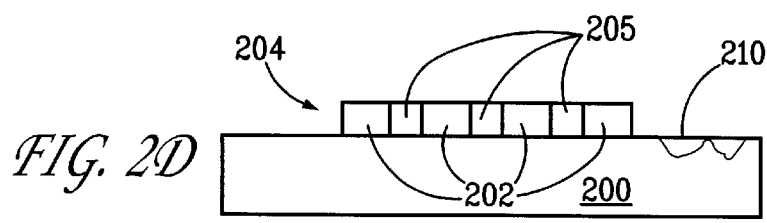

Chemical-mechanical polishing to flatten the surface of the growing structure produces a first structured layer 204 of the desired photonic lattice structure, as shown in FIG. 2d. The first structured layer 204 comprises a planar pattern of silica spacer bars 202 and polysilicon rods 205. The polysilicon rods are elongate, and roughly rectangular in cross section, being $1.2\mu$ wide and $1.6\mu$ thick.

If an undesirable level of stress is present in the polysilicon components, an optional high-temperature annealing step can be performed (e.g., at a temperature of about 1100° C. for several hours). Such annealing can be carried out after the CMP planarization step, and can be repeated after formation of each structured layer in the photonic lattice. This type of structural anneal tends to increase the stress present in silicon oxides. During processing this effect can be offset by growing oxide layers on the back of the substrate. In this material system, there is little problem in growing stacks of layers which total 20 microns in thickness. In some implementations, the oxide material will eventually be removed from the ultimate product, thereby allowing the final layered material composition to relieve any residual stresses in a more benign fashion.

Figure 2E:
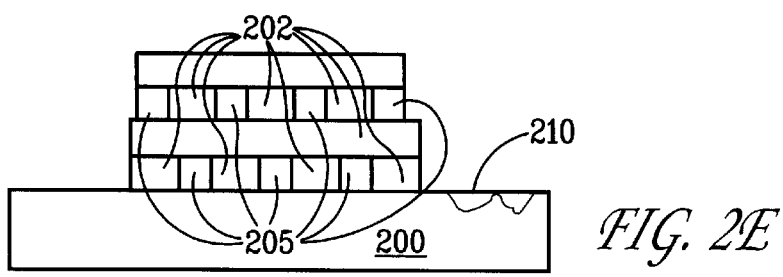

Repeating the same basic set of growth and processing steps, multiple structured layers can be grown on top of a substrate to form the desired photonic lattice. To form Applicants first example, as shown in FIG. 2e, the orientation of the polysilicon rods is rotated 90° between each structured layer, and between every other layer the rods are shifted relative to each other by half of the pitch d. This structure has a face-centered-tetragonal lattice symmetry.

To increase the bandgap width, Applicants added an optional etching step. Once a completed stack of structured layers has been fabricated, the silica spacer bars are removed from the structure by etching with an HF/water solution. The result was a stack of polysilicon bars $1.2\mu$ wide by $1.6\mu$ high in air, with a refractive index contrast of 3.6 and a filling fraction of about 0.28.

The growth, patterning, CMP planarization, and precise stacking of structured layers is the basis for creating photonic lattices according to the present invention. The process steps must be carried out in a manner that insures producing a photonic lattice effectively having the desired large-scale structure. (I.e., with only minor degradation of optical properties from structural errors.) Conventional photolithographic processing techniques are capable of maintaining excellent feature tolerances parallel to the growth plane. The chemical-mechanical planarization process is capable of maintaining excellent tolerances for thickness and parallelism of the individual structured layers.

The remaining degrees of freedom in this "layer by layer" construction of a photonic lattice involve maintaining the proper relative rotational and translational relations between adjoining structured layers. In the present invention this is accomplished by reference to alignment marks 210, shown in FIG. 2, which can be etched into the substrate, into the first structured layer, or replicated into higher levels when lower alignment marks become degraded by processing or depth of focus limitations. Alignment to such marks is a conventional lithographic technique, and allows structures to be positioned to 100 nm or less. Small random misalignments between layers will still occur, but they will not accumulate as the number of layers increases. This is a vast improvement over such "self-aligning" fabrication techniques as Yablonovitch's hole-drilling method, in which angled holes are drilled into a substrate from a triangular lattice of surface sites. Any initial misalignment, taper, or scatter of the drilled holes leads to a cumulative error where critical dimensions degrade to the point that additional layers serve only to scatter light.

A wide variety of optical materials can be used to fabricate a photonic lattice according to the present invention. The first material and the second material can be selected from such materials as polycrystalline silicon (also termed polysilicon), amorphous silicon, silicon nitride, silicon dioxide, and silicate glasses compatible with microelectronics fabrication techniques. Additionally, the III–V semiconductors, the II–VI semiconductors, the II–IV semiconductors, and a wide variety of transparent oxides (in particular the tantalum oxides), sol-gel glasses, and other optically transparent materials which can be deposited in a thin (less than 20 micron) layer essentially free of optical defects, and which have low absorption in the operational wavelength regime, can be fabricated into a photonic lattice using the present invention.

When general optical materials are used as the basis for a photonic lattice, some of the assumptions which were made in the simple example of FIG. 2 may not hold. Chief among these is the ability to use differential etching rates between the first and second materials to help define the structure. In general, the use of stop etch layers and other related techniques well known in photolithography will often result in a less critical process, and a better product.

The properties of precursor materials to some of the optical materials well suited to these applications enables another set of implementations of the present invention. Assume for a moment that a layered material composition has been constructed as outlined above, or using the related techniques described in the remainder of this specification. It is a structured three-dimensional solid consisting of two continuous and interconnecting sublattices, one made of polysilicon, and the other of silicon oxide. (These assumptions are not requirements, but are convenient for this illustration.) Remove the silicon oxide by etching, leaving behind a sponge-like structure of polysilicon having open pores. We can then alter this layered material composition by depositing in the empty spaces a different optical material. Even in the small spaces characteristic of a photonic lattice, this can be accomplished by chemical vapor deposition, by spin-on glass deposition, or by other techniques which are capable of filling fine pores. The result is a new layered material composition whose dimensions and structure have been determined by the silicon-silicon oxide process, but one of whose materials is not compatible with those well known fabrication steps.

One can take such an altered layered material composition, and further alter it by removing the polysilicon sublattice by etching. The final structure now has structure and dimensions defined by conventional silicon processing technology, and is composed essentially solely of, e.g., the spin-on glass. It is therefore possible, using Applicants invention, to produce layered material compositions varying widely in material composition, but having dimensions and structure precisely defined using the well-known silicon lithographic fabrication processes. (Of course, other fabrication processes can be used, and the materials which they manipulate can be replaced by others in an analogous manner.)

It is important to note that most of the structural parameters chosen for the Lincoln-Log structure of FIG. 2 are in no way fundamental. A convenient paradigm for design and fabrication of such structures is to require that each structured layer consist essentially of a tiling comprising tiles, each such tile being substantially identical to some reference tile chosen from a finite group of reference tiles. Each reference tile has a fixed size, shape, and has constant physical properties. In a sense, then, a structured layer in this paradigm consists essentially of tiles which fit together like a jigsaw puzzle (although possibly in three-dimensions rather than only two), each tile having a single color (constant physical properties). It can be useful to include reference tiles having infinite extent. Imagine a structured layer consisting of an aperiodic pattern of round dots, where the space between the dots is filled by a single material. Such a structured layer could be described in terms of the dots, the pattern of the dots, and tiles chosen from an infinite collection of sizes and shapes, all made of the single material, which do not fall into any simple pattern, but fill in the spaces between the dots. It is more efficient, however, to describe this structured layer in terms of the dots and a single, infinite tile having holes for the dots to fit in.

Figure 3A:
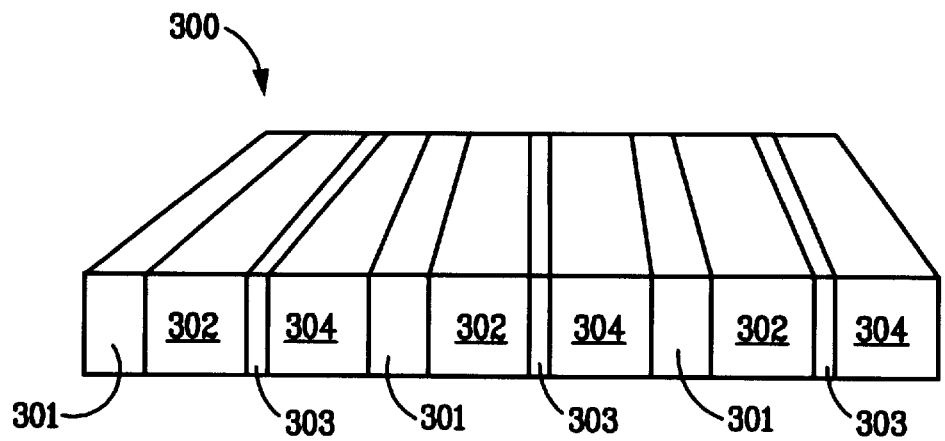
FIG. 3 illustrates various possible structured layers and shapes of substructures therein.
Figure 3B:
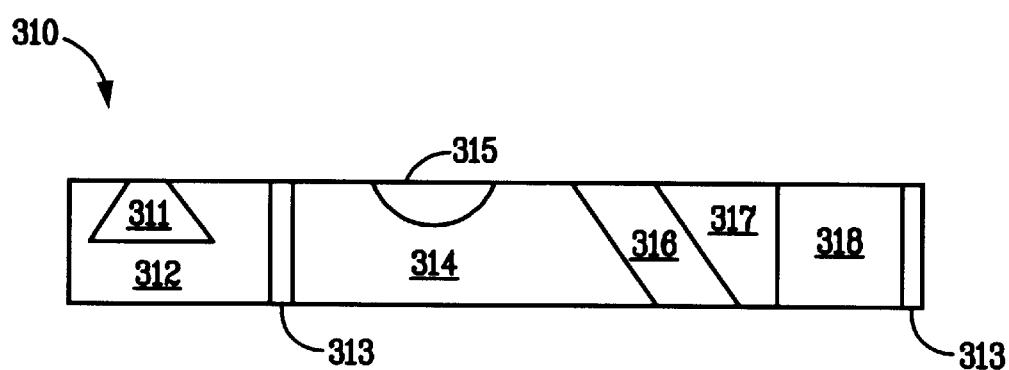

There are very few constraints on the structure of a layered material composition. As shown in FIG. 3a, a structured layer 300 can comprise elements of any number of optical materials 301, 302, 303, 304, etc. (Vacuum is being counted as a material, as are gases.) The features which make up a structured layer need not be rectangular bars arranged parallel to each other, but can take on nearly any shape, size, and orientation. FIG. 3b shows a structured layer 310 comprising spaced elements 311, 312, etc., where the shape, size, and spacing vary throughout the structured layer.

Figure 4A:
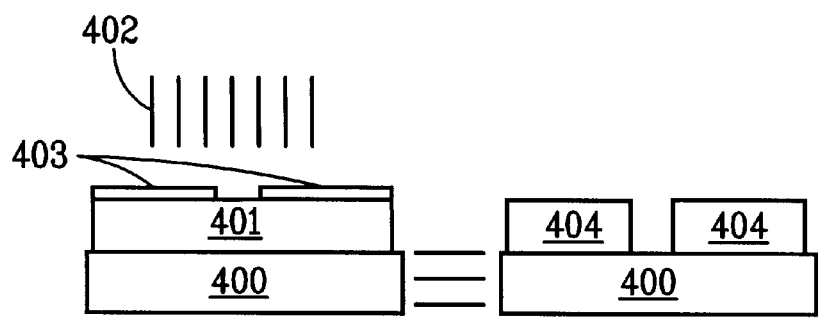
FIG. 4 illustrates how various substructures can be introduced into a structured layer by the use of different etching techniques.

The shape of the elements making up the structured layers can also be controlled during fabrication. In Applicants example above, the features were defined using an anisotropic etching technique (reactive ion etching) that was used to obtain nearly vertical walls. This is illustrated in FIG. 4a, where a layer 401 has been deposited on a substrate 400, which is being subjected to a reactive ion etch beam 402. Most of the surface of layer 401 is protected from etch beam 402 by masking means 403, but a small area is open to the effects of the etch beam.

Figure 4B:
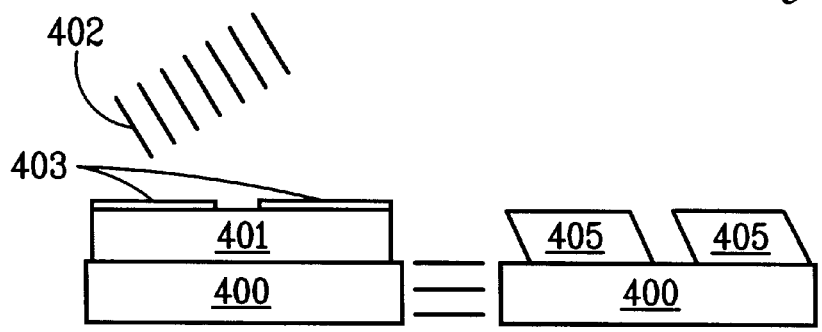
Figure 4C:
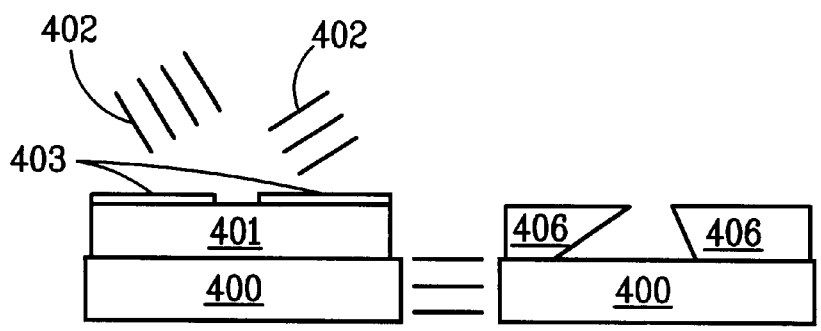

Reactive ion etching is a directional and highly anisotropic technique (by directional we mean that the characteristic direction of the anisotropy in etching rate does not derive primarily from the properties and orientation of the material being etched, but rather by some characteristic of the etching apparatus, in this case the orientation of the ion beam). Accordingly, the structures 404 resulting from this scenario have nearly rectangular cross-section. If the reactive ion beam 402 is directed at an angle to the substrate, however, (FIG. 4b) the cross-section of the resulting structures 405 become roughly rhomboidal (corners and other sharp features become rounded). If one imagines the beam being directed at an angle from either side of the long axis of the features (FIG. 4c), then the cross-section of the etched structures 406 become roughly trapezoidal. (Such shapes can force complementary materials to have triangular cross-sections.) Finally, if the direction of the etching beam is varied along the length of the mask, the cross-section of the etched structures will also vary along the length of the structures.

Figure 4D:
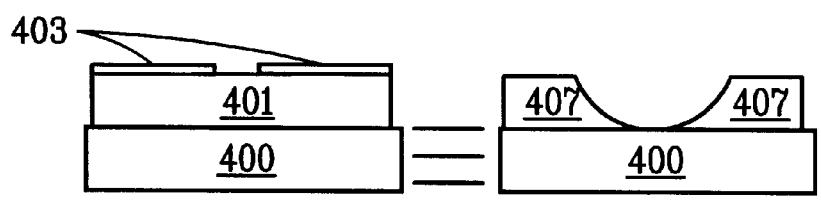

Other etching techniques can be used to define the structure of the etched structures. For example, using an isotropic etch (not illustrated) can produce elements 407 (FIG. 4d) roughly between semicircular and circular in cross-section. Other possibilities, including the use of etching techniques to give a wide range of shapes to local structural features are generally known in photolithography, but have not previously been used to fabricate photonic crystals.

Figure 5:
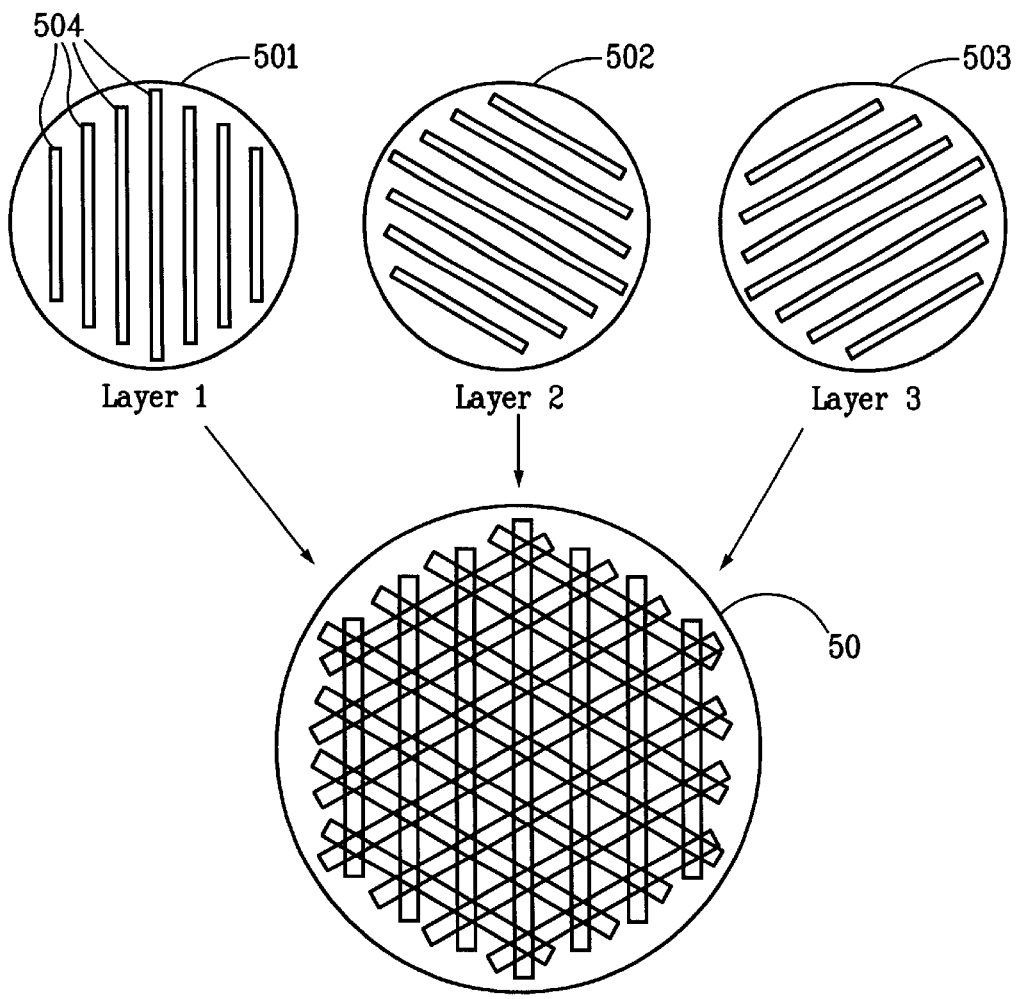
FIG. 5 shows the structure of a Lincoln-Log photonic lattice whose individual structured layers are identical, but their relative position and orientation is different from that shown in FIG. 2.

Alignment and positioning of structured layers relative to each other need not follow the simple and constant formula of Applicants example above For example, in FIG. 5 we show a new photonic lattice structure 50 comprising structured layers 501, 502, and 503, comprising rods 504. However, instead of the 90 degree rotations and half a step sideways every other layer of Applicants example, here we rotate each successive structured layer by 60 degrees, and align the layers so that the projection of their intersection points onto the substrate forms a triangular lattice, thus giving a 3-layer vertical periodicity. For appropriate feature dimensions and refractive indices, this structure is also a photonic lattice exhibiting a bandgap. More structural degrees of freedom are associated with the structured layers. For example, the thicknesses of the structured layers need not be constant throughout the stack. The size, spacing, and separation of elements making up the structured layers can also vary between layers.

Figure 6:
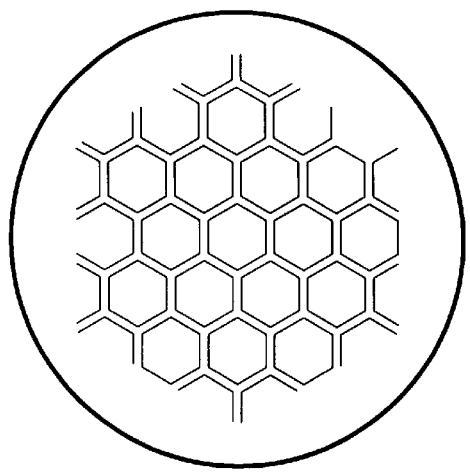
FIG. 6 shows an example of a layer-by-layer photonic lattice which is not a Lincoln-Log structure.
Figure 6:
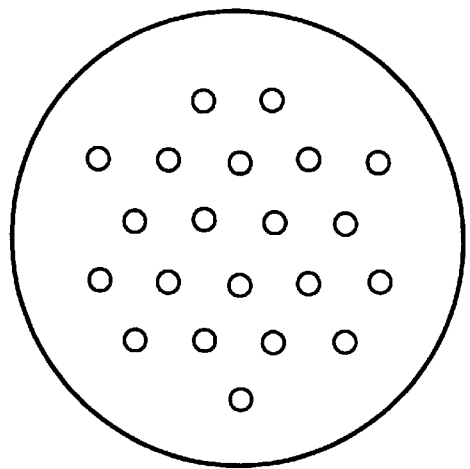
Figure 6:
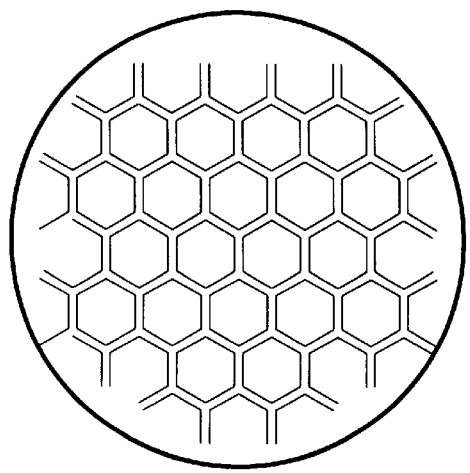
Figure 6:
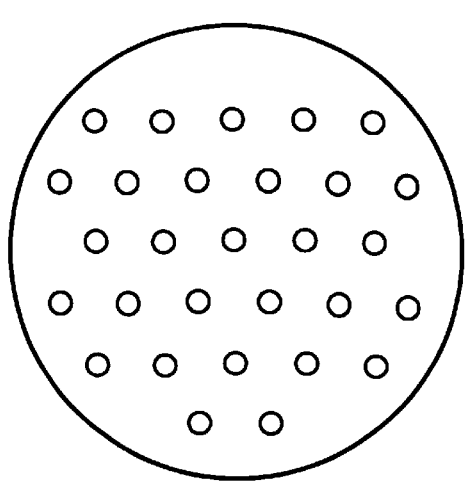

The restriction to Lincoln-Log structures is also not required by the present invention. As long as individual layers can be made with conventional photolithographic techniques, or other approaches known in the art, and the photonic lattice consists essentially of a stack of layers, then the present invention can be used for fabrication. An example is shown in FIG. 6. Here the first layer includes a continuous hexagonal distribution of a first material, the voids of the array being filled with a second material. The thickness of the layer is 0.25 times the length of one of the rods. This does not fit within the definition of a Lincoln-Log structure. The second layer consists essentially of a triangular array of circular dots made of the first material, the dots embedded in the second material. These dots are about half the length of one of the rods in diameter, and are located atop the junctions of every second row of junctions of the hexagonal pattern of the first layer. The second layer is twice the thickness of the first.

The third and fourth layers are identical to the first two layers, save that they have been translated along the 30° diagonal. (This positions the vertices of the third layer over the centers of the hexagons of the first layer.) The same translation is made between the fourth and fifth layers, the result of which is to position the rods of the seventh layer directly over those of the first layer. This defines a 4-layer periodic structure which is not a Lincoln-Log structure, with local features and in equivalent layer structures which produces a photonic lattice with a bandgap.

Figure 7:
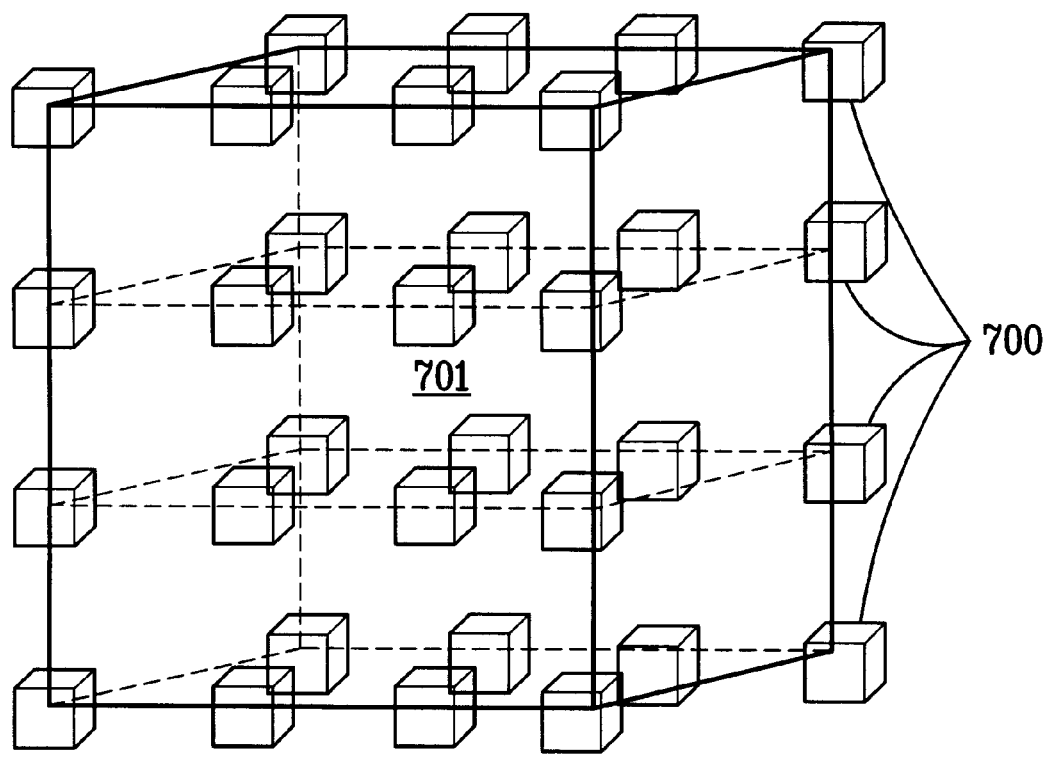
FIG. 7 shows an example of a layer-by-layer photonic lattice which is not stable upon removal of the component with the larger volume fraction.

All of the photonic lattices described above retain their structure if the second material is etched away after fabrication is complete. This is also not a required property for a layered material composition unless the additional contrast in refractive index that results when replacing the second material with air is necessary for the immediate application. Otherwise the second material can remain in place. An example in which the second material cannot be removed without causing structural collapse is shown in FIG. 7, and consists of a simple rectilinear lattice where the high-index elements 700 take the form of cubes of the first material positioned at the vertices of the lattice. The cubes do not touch each other. This structure does violate the guideline that large photonic bandgaps are associated with continuous low-index and high-index configurations. However, such a structure can show useful optical behavior, and further recall that the present invention is applied to fabrication of layered material compositions, and is not limited to photonic bandgap materials. Clearly, the structure of FIG. 7 depends on the presence of the second material 701 for its structure, much as grapes in gelatin will not float in midair if the gelatin is removed.

Finally, an emphasis has been made on the fabrication of fully three-dimensional photonic lattices above. The present invention also lends itself to making one- and two-dimensional photonic lattices, both of conventional design and of a new bulk form. The conventional one-dimensional photonic lattice is simply a stack of layers, each layer having a uniform composition. The axis of the lattice is then normal to the surface of the substrate on which the layers is grown.

An interesting type of one-dimensional photonic lattice for which there is no other practical fabrication method is one where the axis of the photonic lattice is parallel to the surface of the substrate. This can be accomplished by growing many copies of the first structural layer 204 in FIG. 2, with each copy having the same position and orientation as the first. The resulting structure, shown in FIG. 10, is a horizontal pile of layers 1000, whose symmetry axis is 1002 is parallel to the growth surface of the substrate 1001. Here the result is a one-dimensional dielectric mirror which could in no other manner be so perfectly integrated into, e.g., an integrated optic circuit on a chip. Such non-vertically directed structures have great potential for use in integrated optics and optoelectronic devices.

The conventional two-dimensional photonic lattice is implemented within a single structural layer, the two-dimensional structure within that layer giving the desired optical properties. By using the present invention to form and combine numerous layers having that same internal structure, one can obtain a very thick "two-dimensional" photonic lattice. Such have many possible applications in cavity and resonator applications, particularly when combined with properly designed lattice defects.

It has been shown above that the present invention adapts well to the fabrication of an enormous range of photonic lattices. Nearly any structure which can be smoothly decomposed into a series of layers having essentially flat and parallel surfaces can be so fabricated. The present invention also lends itself in a natural way toward fabrication of a wide range of quasiperiodic and aperiodic photonic lattices (and more generally, layered material compositions). Despite their lack of true periodicity, such structures often exhibit many of the same effects as do periodic photonic lattices.

The feature size for any photonic lattice is typically much smaller than the vacuum wavelength at which the periodicity of a photonic lattice can alter optical propagation. For example, in Applicant's first example, the rod cross-section was $1.2\mu \times 1.6\mu$ for a bandgap wavelength of about $12.5\mu$ in vacuum. Accordingly, the practical restriction on the operating regime for a photonic lattice is often not controlled by material properties, but rather by the limited ability of current photolithographic equipment to properly define the features.

A concrete example of this problem was encountered in fabricating Applicant's second example, which had a bandgap center wavelength of some $1.7\mu$. This followed the simple Lincoln-Log structure of FIG. 2e, with the rod cross-section targeted at $0.18\mu \times 0.22\mu$, and the pitch of the rods at $0.65\mu$. The difficulty was that the available lithographic fabrication equipment was incapable of defining features less than about $0.5\mu$ in size. Applicants invented a new fabrication procedure, still incorporating chemical-mechanical polishing, but also using fillet processing to define the smallest features.

Figure 8A:
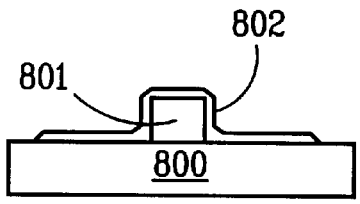
FIG. 8 shows the principle of the fillet procedure, and examples of the types of surface structure which can be generated thereby.
Figure 8B:
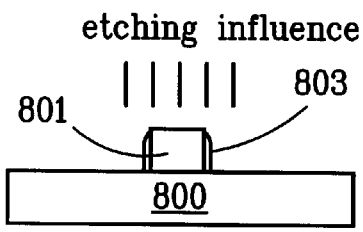
Figure 8C:
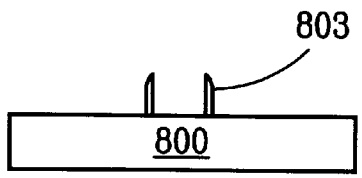

Fillet processing allows the definition of structural features which do not lie in the plane of the structured layer whose dimensions in that plane are very small. A fillet procedure (i.e., a process leading to the formation of a fillet) as shown in FIGS. 8a–8c comprises at its essence the following steps. First (FIG. 8a), a fillet definition structure 801 is defined on a substrate 800 using conventional microelectronic lithographic methods. The fillet definition structure is then overcoated with a protofillet layer 802. Note that the protofillet layer on the side walls defines a structural element which is very small normal to the step wall and to the substrate surface. If attempts are made to adapt conventional lithographic processing to the definition of such small horizontal structures, a fundamental limitation appears associated with the resolution of the alignment stepper motors. Fillet procedures avoid this limitation for those geometries compatible with fillet processing.

The continued formation of isolated fillet structures is shown in FIGS. 8b and 8c. FIG. 8b shows an etching step which, although not required simply to define fillet structures, is required to allow them to stand alone, a feature useful for some applications. In this step an anisotropic etching influence (e.g., a reactive ion etching beam) impinges normally on the substrate from some source (not shown). This etching influence substantially removes the protofillet layer from the surface of the substrate 800, and from the top of fillet definition structure 801, leaving a thin vertical fillet 803 along each side wall of the fillet definition structure. Given that the height of the fillet definition structure 801 is at least several times the thickness of the protofillet layer 802, the resulting fillet 803 has substantially constant thickness. If the part of the protofillet layer 802 which is deposited on the substrate surface can be tolerated (or is useful) within the desired layered material composition, then the portion on top of the fillet definition structure can be removed using chemical-mechanical polishing. In some instances, it may be appropriate to use the protofillet layer itself without further definition. The key feature is the fabrication of a very thin horizontal structure, and further refinement may not be required for a given application.

Figure 8D:
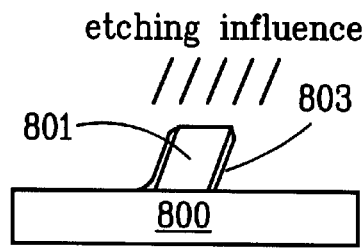

One approach to further refinement is to remove the remnants of the fillet definition structure 801 by preferential etching, resulting in the structure shown in FIG. 8c. The resulting isolated fillets 803 can be incorporated in a structured layer by overcoating and planarization as using process steps similar to those illustrated previously in FIG. 2. Note that the sides of the fillet definition structure 801 need not be vertical (FIG. 8d). Fillets can also be defined on the edges of rather complex fillet definition structures. For example, the plane-filling hollow hexagonal pattern of structural layers 1 and 3 in FIG. 6 could easily be covered with a protofillet layer. Anisotropic etching would then leave very thin fillet layers on the side walls of the hexagonal pattern, and those fillet layers could, if desired, be isolated by removing the hexagonal structure by etching, thereby leaving a pattern of very thin walled hexagons in air. The additional design freedom offered by such structures is enormous, and makes possible the practical implementation of large numbers of previously purely theoretical layered material compositions.

Figure 8E:
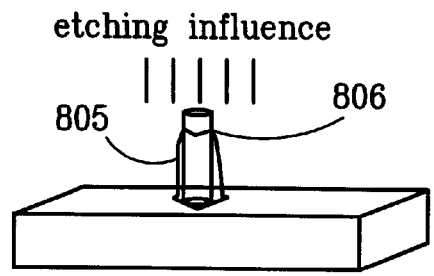
Figure 8F:
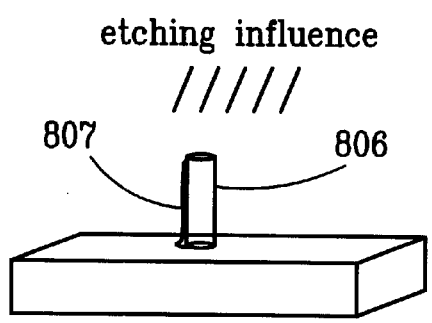

The last example showed that fillet processing need not be applied to fabricating long-straight fillets. One can go further in this direction as shown in FIGS. 8e and 8f. Here we show that local features of various types can be fabricated using fillet processing. In FIGS. 8e and 8f, a protofillet film 805 is grown over a fillet definition structure 806, said structure here taking the form of a cylinder protruding from the surface of the substrate 800. In FIG. 8e an anisotropic etching influence is directed normal to the substrate surface, so that the resulting fillet has roughly the shape of a hollow cylinder whose inside diameter is the outer diameter of cylinder 806, whose outside diameter is the inside diameter plus twice the thickness of the protofillet film 805, and whose height is slightly less than that of the cylinder 806. If the cylinder 806 is then removed, by etching or other process, the hollow cylinder 805 remains. In FIG. 8f, the protrusion 806 can shield only a small portion of the thin film, so that all of the protofillet layer is removed, save for that within a very thin and narrow vertical feature 807. As thin film thickness can be tightly controlled during fabrication, the above processing steps can lead to controlled feature widths of a few hundred Angstroms with ease, making possible fabrication of photonic lattices with bandgaps far into the ultraviolet.

Figure 9A:
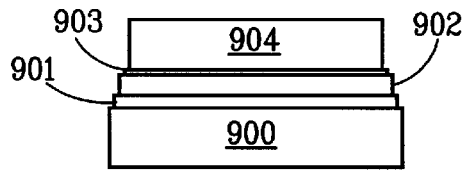
FIG. 9 shows various stages in the fabrication of a photonic lattice according to the present invention including a fillet procedure.
Figure 9B:
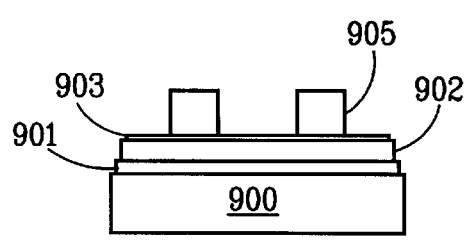

Applicants applied these ideas of fillet processing to the problem of fabricating a three-dimensional photonic lattice having a complete bandgap in the near-IR. Such a structure had not previously been demonstrated, and is of considerable interest for applications in fiber optic communications. FIG. 9 shows the process used to make the near-IR photonic lattice. In FIG. 9a, a polysilicon layer 902 is deposited on top of a thin layer 901 (typically~100 nm) of silicon nitride coating a silicon substrate 900. The polysilicon thickness is $0.22\mu$, the desired finished height of the first layer of the photonic lattice. A second layer 903 (typically~50 nm) of silicon nitride is then deposited atop the polysilicon, and a sacrificial layer 904 of 500 nm of $SiO_2$ is deposited and densified by heat treatment. Next the sacrificial layer is patterned as shown in FIG. 9b. The goal is ultimately to create $0.18\mu$ wide fillets with a pitch of $0.65\mu$ along the edges of the remaining $SiO_2$ rows. To accomplish this and achieve even spacing between the fillets, the $SiO_2$ steps 905 are $0.47\mu$ in width, and are separated by $0.83\mu$. In practice, this was accomplished by creating a uniform pattern of $SiO_2$ rows $0.65\mu$ wide with $0.65\mu$ spacing, allowing about 50 nm of $SiO_2$ to remain between the rows. Then a wet etch (30 seconds in room temperature 6:1 ammonium fluoride/HF mixture isotropically removed ~90 nm of $SiO_2$, thereby creating the desired process structure.

Figure 9C:
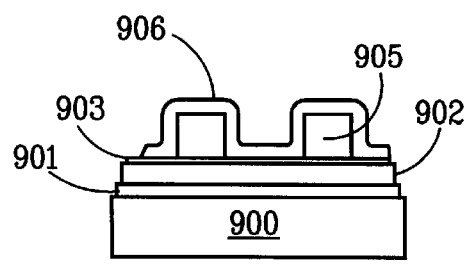
Figure 9D:
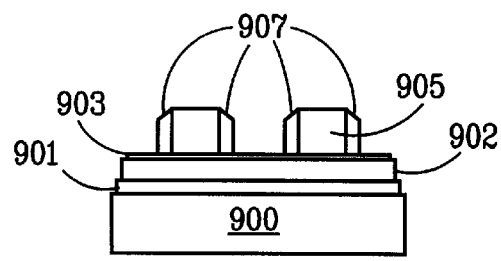
Figure 9E:
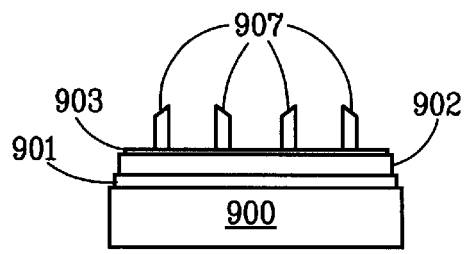

The 180 nm layer of polysilicon 906 which will become the fillets is then isotropically deposited as shown in FIG. 9c. Isotropic deposition insures that the fillet width is equal to the polysilicon layer thickness. The polysilicon is then anisotropically etched using a high density plasma process to remove the polysilicon on the horizontal surfaces, while substantially allowing the fillets 907 on the vertical walls of the $SiO_2$ rows to remain (FIG. 9d). This step could alternately be carried out using an additional chemical-mechanical polishing step. At this point the sacrificial layer of $SiO_2$ is stripped using a wet etch (FIG. 9e).

Figure 9F:
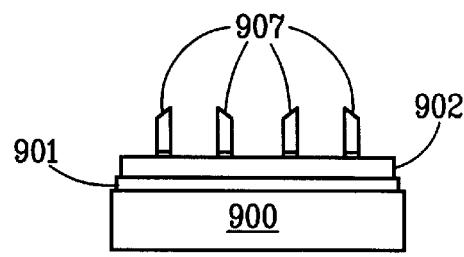
Figure 9G:
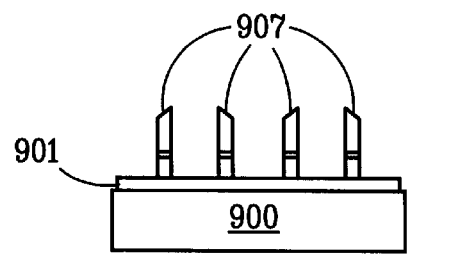

The fillet structures 907 now standing isolated on the surface have uniform width, but somewhat inconsistent height owing to the extensive processing they have undergone. Although one could attempt to use these "pre-fillets" as members of the photonic lattice, Applicants chose to use them as a mask to anisotropically etch the underlying layers, and thereby produce polysilicon fillets of substantially uniform height and thickness. The first step is to wet etch the upper SiN layer 903, thereby reproducing the fillet structure on the polysilicon layer 902 (FIG. 9f). Then the remaining pre-fillet material forms a mask for etching the fillet pattern 907 into the polysilicon layer (FIG. 9g). Note that as this etching step proceeds, the height of the "pre-fillets" becomes smaller while allowing material to remain above the polysilicon layer. A layer of $SiO_2$ is then deposited, said layer having sufficient thickness to fill in the gaps between neighboring fillets.

Figure 9H:
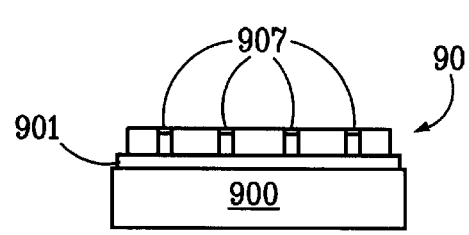

At this point, the structure is subjected to chemical-mechanical polishing, planarizing the structure back to the remnants of the upper SiN layer (FIG. 9h). The CMP processing is critical since it prevents topological nonplanarities generated in a given level from propagating and magnifying in subsequent layers. As discussed earlier, this step is essential to the fabrication of photonic lattices having many levels.

The above has described how the first structured layer 90 of the photonic lattice was made. The entire process is repeated, with changes in orientation as required, to form the subsequent layers of the structure. As before, it is preferable for subsequent layers to be aligned with respect to references traceable to the first layer. This avoids accumulation of alignment and positioning errors, and allows very complex periodic structures to be fabricated. When the desired number of layers are grown, the $SiO_2$ between the polysilicon lines can be removed, if desired for the given application, by etching in, e.g., a concentrated HF/water solution. This technique was used to make Applicants second example.

Although the "fillet" process described above was implemented in a particular material system, it can be used to form a photonic lattice of any material for which suitable sacrificial and stop etch materials exist. This includes most of the materials compatible with chemical-mechanical polishing, so the fillet process can be regularly used in the fabrication of photonic lattices. The fillet process can be applied to the fabrication of the same range of structures listed earlier as suited to fabrication processes comprising CMP.

The specification and drawings illustrated general concepts and process steps by way of specific implementations of the present invention. The present invention is not intended to be limited by the discussion of specific implementations. Rather, the scope of the invention is intended to be limited only by the claims hereto appended.

What is claimed is:

1. A process for fabricating a layered material composition for forming a photonic of phononic lattice, comprising steps for:
   a) forming, upon an upper surface of a substructure, a structured layer having a top surface and a substantially planar bottom surface;
   b) planarizing the top surface of said structured layer by chemical-mechanical polishing; and,
   c) repeating steps a and b to form the layered material composition wherein optical or acoustical properties spatially vary in two or three dimensions, and
   wherein the planarized top surface of a given layer forms the upper surface of the substructure upon which the next structured layer is to be grown.

2. The process of claim 1, wherein all structured layers have the same structure and composition.

3. The process of claim 1, wherein at least two of the structured layers differ in structure.

4. The process of claim 1, wherein at least two of the structured layers differ in composition.

5. The process of claim 1, wherein the material of at least one structured layer has spatially varying physical properties.

6. The process of claim 5, wherein said spatially varying physical properties vary substantially periodically in the plane of the bottom surface of said structured layer.

7. The process of claim 5, wherein said spatially varying physical properties vary substantially quasiperiodically in the plane of the bottom surface of said structured layer.

8. The process of claim 5, wherein said spatially varying physical properties are substantially invariant in the plane of the bottom surface of said structured layer.

9. The process of claim 5, wherein the layered material composition is a photonic lattice, and said spatially varying physical properties comprise refractive index.

10. The process of claim 5, wherein the top surface and the bottom surface of the structured layer are substantially parallel.

11. The process of claim 10, wherein the upper surface of the substructure is planarized using chemical-mechanical polishing prior to forming said structured layer.

12. The process of claim 10, wherein said structured layer comprises a configuration of tiles, where each tile is substantially identical to some reference tile chosen from a group of reference tiles.

13. The process of claim 12, wherein said configuration comprises a periodic pattern of said tiles.

14. The process of claim 12, wherein said configuration comprises a periodic tiling consisting essentially of said tiles.

15. The process of claim 12, wherein said configuration comprises a quasiperiodic tiling consisting essentially of said tiles.

16. The process of claim 12, wherein said structured layer consists essentially of said tiles.

17. The process of claim 12, wherein the step of forming said structured layer comprises the steps of:
   a) depositing a first film of a first material upon said upper surface;
   b) defining a pattern upon said first film;
   c) patterning said first film according to said pattern; and,
   d) depositing, atop said patterned first film, a second film of a second material.

18. The process of claim 17, wherein the patterning step comprises removing material from said first film to a depth equal to the thickness of said first film.

19. The process of claim 17, wherein the thickness of said first film plus the thickness of said second film, less the depth of material removed from said first film in the patterning step, is at least equal to the desired thickness of said structured layer.

20. The process of claim 17, further comprising the step of removing said first material from said structured layer.

21. The process of claim 17, further comprising the step of removing said second material from said structured layer.

22. The process of claim 17, further comprising the separate steps of removing said first material from said structured layer, and of removing said second material from said structured layer.

23. The process of claim 17, wherein the step of patterning comprises use of an anisotropic etching technique.

24. The process of claim 17, wherein the step of patterning comprises use of an isotropic etching technique.

25. The process of claim 17, wherein the step of patterning comprises use of an etching technique which preferentially etches said first film relative to the upper surface and proximate regions of said substructure.

26. The process of claim 17, wherein said pattern is substantially one dimensional.

27. The process of claim 26, such that said patterned first film has a shape which is substantially invariant along directions parallel to a first axis which lies in the plane of the top surface of said first film.

28. The process of claim 17, wherein said pattern is substantially two dimensional.

29. The process of claim 28, such that said patterned first film has a shape which is substantially periodic in the plane of the top surface of said first film.

30. The process of claim 17, wherein said pattern is substantially quasiperiodic.

31. The process of claim 5, wherein the step of forming said structured layer comprises a fillet procedure comprising the following steps:
   a) patterning a fillet definition structure comprising fillet defining features; and, b) overcoating said fillet definition structure with a proto-fillet layer.

32. The process of claim 31, wherein said fillet procedure further comprises filling in the spaces between the overcoated fillet defining features with a filler material.

33. The process of claim 31, wherein said fillet procedure further comprises reducing the thickness of the overcoated fillet definition structure.

34. The process of claim 31, wherein the step of reducing the thickness of the overcoated fillet definition structure comprises the use of an anisotropic etching technique.

35. The process of claim 31, wherein the step of reducing the thickness of the overcoated fillet definition structure comprises the use of chemical-mechanical polishing.

36. The process of claim 31, wherein the step of reducing the thickness of the overcoated fillet definition structure also exposes all parts of the fillet definition structure to etching processes.

37. The process of claim 31, wherein said fillet procedure further comprises the step of removing part or all of the fillet definition structure.

38. The process of claim 37, such that isolated fillet structures are generated.

39. The process of claim 38, wherein said fillet procedure further comprises extending said isolated fillet structures into underlying layers via etching wherein the isolated fillet structures function as a fillet etching mask.

40. The process of claim 38, wherein said fillet procedure further comprises the steps of:

a) filling in the spaces between said isolated fillet structures to a depth at least equal to that of the design height of said isolated fillet structures; and, b) planarizing the top surface using chemical-mechanical polishing.

41. The process of claim 1, further comprising aligning the structured layer with respect to the substructure so that the resulting structure is consistent with the design of the layered material composition.

42. The process of claim 41, wherein said substructure comprises alignment marks and the process of aligning the structured layer and the substructure uses said alignment marks as reference points.

43. The process of claim 42, where said alignment marks are traceable to an original set of alignment marks on the layered material composition.

* * * * *